United States Patent [19]

Weterings et al.

[11] 4,387,077

[45] Jun. 7, 1983

[54] PROCESS FOR THE RECOVERY OF SUBSTANTIALLY RADIUM FREE CALCIUM SULPHATE, YTTRIUM AND LANTHANIDES, AS WELL AS CALCIUM SULPHATE, YTTRIUM AND LANTHANIDES OBTAINED BY THIS PROCESS

[75] Inventors: Cornelis A. M. Weterings, Stein; Louis H. M. Ramakers, Heel; Johannes A. Janssen, Schinveld, all of Netherlands

[73] Assignee: Stamicarbon, B.V., Geleen, Netherlands

[21] Appl. No.: 330,519

[22] Filed: Dec. 14, 1981

[30] Foreign Application Priority Data

Dec. 20, 1980 [NL] Netherlands .......................... 8006946

[51] Int. Cl.$^3$ .......................... C01F 1/00; C01F 17/00; C22B 59/00; C01B 25/16
[52] U.S. Cl. .................................. 423/21.1; 423/21.5; 423/167; 423/319; 423/320
[58] Field of Search ............... 423/166, 167, 317, 319, 423/320, 21.1, 21.5, 2, 555

[56] References Cited

U.S. PATENT DOCUMENTS

| 1,944,048 | 1/1934 | Walker et al. | 423/320 |
| 2,531,977 | 11/1950 | Hammouen et al. | 423/320 |
| 3,647,361 | 3/1972 | Coltrinari et al. | 423/21.1 |
| 4,041,125 | 8/1977 | Alstad et al. | 423/21.1 |
| 4,282,192 | 8/1981 | Larson | 423/167 |

Primary Examiner—O. R. Vertiz
Assistant Examiner—Gregory A. Heller

[57] ABSTRACT

Recovery of yttrium, lanthanides and radium free calcium sulphate in a phosphoric acid process by digesting phosphate rock with an excess of phosphoric acid in the presence of more than about 5 wt.% of $SO_4$-ions calculated to the amount of phosphate rock, separating out the insoluble residue and recovering yttrium and lanthanides therefrom, precipitating calcium sulphate from the remaining solution with sulphuric acid and separating this calcium sulphate from the resulting phosphoric acid solution.

10 Claims, 3 Drawing Figures

PROCESS FOR THE RECOVERY OF SUBSTANTIALLY RADIUM FREE CALCIUM SULPHATE, YTTRIUM AND LANTHANIDES, AS WELL AS CALCIUM SULPHATE, YTTRIUM AND LANTHANIDES OBTAINED BY THIS PROCESS

BACKGROUND OF THE INVENTION

The present invention relates to a unique process for the recovery of substantially radium free calcium sulphate, yttrium and lanthanides in a phosphoric acid preparation process comprising the steps of digesting phosphate rock in the presence of sulphate ions, with an excess of phosphoric acid required for the formation of monocalciumphosphate, separating out the insoluble residue, precipitating calcium sulphate from the remaining solution with sulphuric acid and separating the calcium sulphate from the phosphoric acid solution formed.

One process for the preparation of phosphoric acid and calcium sulphate is disclosed in the U.S. Pat. No. 2,531,977. In the process described therein, phosphate rock is digested with recirculated phosphoric acid product, which contains 0.15–1% free sulphuric acid, subsequently the insoluble residue is separated out, the remaining solution treated with sulphuric acid during which calcium sulphate is precipitated, and the calcium sulphate separated from the phosphoric acid solution formed. The residue separated out is washed with water to remove soluble phosphates. The washing water is then added to the phosphate rock digestion liquor and the remaining solid residue is discharged. While in this known process a fairly pure calcium sulphate is obtained as a byproduct, the lanthanides and yttrium present in the phosphate rock are lost. Moreover, the radium content of the calcium sulphate obtained is still relatively high, which may form an obstacle for various industrial applications, particularly applications in the building industry.

A process for the recovery of practically radium free calcium sulphate in a wet process phosphoric acid preparation is disclosed in the German Auslegeschrift No. 2,218,382. To this end a barium compound is added, in the presence of sulphate ions, to the liquid obtained by digesting phosphate rock with an excess of phosphoric acid, and the radium-containing precipitate is separated off.

One disadvantage of this process is that for the precipitation of the radium a barium compound must be used which has an unfavorable effect on the cost of the process in view of the market price of barium compounds. Moreover, in this process, the valuable lanthanides and yttrium present in the phosphate rock will also be lost.

DESCRIPTION OF THE INVENTION

However, the present invention provides a process by means of which it is possible, in a simple manner, in a wet process phosphoric acid preparation, to recover a practically radium free calcium sulphate and also recovering a large percent of the lanthanides and yttrium present in the phosphate rock.

This is achieved, according to the process of the present invention, by digesting the phosphate rock with phosphoric acid in the presence of more than almost 5% by weight of sulphate ions calculated in respect of the quantity of phosphate rock and separating out the yttrium and lanthanides from the insoluble residue separated off which contains radium, yttrium and lanthanides.

While the digestion of phosphate rock with phosphoric acid in the presence of 4.5 to 15% by weight of sulphate ions is described in the U.S. Pat. No. 3,418,077, in this process the digestion liquor formed is immediately treated with sulphuric acid without residue being separated out in the interim, so that the calcium sulphate obtained as byproduct has a very high radium content (about 24 pCi/g). Moreover, this patent discloses nothing about the recovery of yttrium and lanthanides.

In the process according to the present invention, the required sulphate content of more than about 5% by weight during the digestion of phosphate rock can be obtained in various known ways.

Thus, the precipitation of the calcium sulphate can be effected with a large excess of sulphuric acid required for the formation of phosphoric acid, and part of the raw phosphoric acid remaining after separating off the calcium sulphate, which phosphoric acid has a high sulphate content, can be returned to the phosphate digestion.

If so desired, the raw phosphoric acid can be settled after separating out the calcium sulphate, in which process, as sediment, a slurry (the so-called weak acid slurry) is obtained. This slurry, together with a part of the raw phosphoric acid can be returned to the phosphate rock digestion. Preferably part of the sulphuric acid required for the precipitation of calcium sulphate is added in the phosphate rock digestion process. Combinations of the processes described above are, of course, also possible.

For the purpose of obtaining a calcium sulphate with a permissible radium content, starting from the commonest types of phosphate rock, the digestion of the phosphate rock is preferably carried out in the presence of such a quantity of sulphate ions that at least about 80% by weight or more of the radium present in the phosphate rock is precipitated as radiumsulphate and at most about 20% by weight of the calcium present in the phosphate rock is precipitated as calcium sulphate.

For the recovery of yttrium and lanthanides from the separated off insoluble residue, the residue is preferably first washed with water for the purpose of removing the entrained soluble phosphate components, and the phosphate containing washing water is subsequently added advantageously to the monocalciumphosphate.

The residue remaining after the optional washing is preferably treated with an acid, in which process an acid liquid containing yttrium and lanthanides is obtained on the one hand and, on the other hand, an insoluble solid mass, the solid mass is separated off from the acid liquid and, is for instance, discharged. The acids that can be used include mineral acids, such as nitric acid, sulphuric acid or hydrochloric acid, and organic acids, such as oxalic acid or citric acid. Preferably nitric acid is used. It may be advantageous, particularly when applying concentrated mineral acids to calcine the residue before hand. The quantity of acid is not critical, but must only suffice to dissolve all components soluble in acid from the residue. Generally, a quantity of acid of about 100 to about 1000% by weight calculated in respect of the quantity by weight of residue is applied.

From the resulting acid liquid, yttrium and lanthanides can be separated out in various ways, for instance, by precipitation, ion exchange, electrolysis or preferably, after neutralization, by extraction with an organic compound. As such alkylphosphates, alkylpyrophosphates, alkylphenylphosphates, or aliphatic carboxylic acids with branched chains, preferably dissolved in an organic solvent, such as kerosene, can be applied among others. The quantity of extractant may vary, for instance from about 10 to about 100% by weight calculated in respect of the quantity of neutralized liquid. From the extractant phase formed, yttrium and lanthanides can finally be separated out in a simple manner by, among other things, precipitation, ion exchange or preferably by re-extraction with dilute nitric acid, hydrochloric acid or oxalic acid. From the acid liquid resulting during the re-extraction, yttrium and lanthanides can be precipitated, for instance, by addition of ammonia, upon which the precipitate formed can be further processed in a known manner.

From the acid liquid resulting during the re-extraction with dilute acid, yttrium and the separate lanthanides can be recovered, if so desired, by extraction with a special organic extractant followed be selective stripping in various steps.

It has been discovered that a more rapid and complete precipitation of the residue from the phosphate rock digestion liquor is obtained if a small quantity of flocculant is added to this liquor. Various known flocculants such as polyacrylamides or acrylamide-acrylate copolymers, preferably in the form of an aqueous solution, can be applied. Generally a quantity of flocculant of about 0.003 to about 0.1% by weight, calculated in respect of the quantity by weight of $P_2O_5$ in the digestion liquor, is applied.

Furthermore, it has been found that the precipitation efficiency of several lanthanides, particularly of cerium, samarium, lutetium and europium, can be increased and, moreover, a substantial part of the uranium present in the phosphate rock can be precipitated together with the lanthanides, by adding to the phosphate rock or to the digestion liquor a small amount, e.g. about 0.25 to about 1.5% by weight calculated in respect of the amount of phosphate rock, of a reducing agent, such as powdered metallic iron, zinc or aluminium.

The process according to the present invention can, in principle, be applied in any type of wet process phosphoric acid preparation, for instance in a process in which the phosphate digestion liquor is converted with sulphuric acid directly into phosphoric acid and the desired calcium sulphate modification (the so-called direct dihydrate, hemihydrate or anhydrite processes), as well as in processes in which the calcium sulphate obtained as byproduct is brought, after or before separating off from the phosphoric acid solution, into another state of hydration (for instance the so-called hemi-dihydrate or di-hemidrate processes).

The calcium sulphate recovered in the present process, which is substantially free of radium, can be used for various purposes, whether or not after conversion into another state of hydration, for instance, for the production of building elements, auxiliary in the cement industry, coating or filler in the paper, paint of plastics industry and as starting material for the preparation of technically pure calcium compounds and sulphurdioxide.

The phosphoric acid resulting after separating out the calcium sulphate, which phosphoric acid is substantially free of organic and inert components, can be used for various purposes, for instance as raw material for the preparation of high grade fertilizers, technical phosphates and cattle feed phosphate. If so desired, the phosphoric acid can be subjected to a treatment for the recovery of uranium, for instance through a precipitation process as described in the European patent application No. 15589. From the resultant phosphoric acid, however, uranium can be recovered advantageously via an extraction process, for instance as described in the non-prepublished Dutch patent application No. 8.000.832, because in applying the process according to the present invention most of the compounds present in the phosphate rock, which have a disturbing effect in such an extraction process, have been removed along with the residue. This occurs, in particular, if a flocculant has been added to the phosphate rock digestion liquor.

The invention will be elucidated in the examples and by means of the attached figures, in which a diagrammatic embodiment of the process is given.

DRAWINGS

FIG. 1

Figure 1:
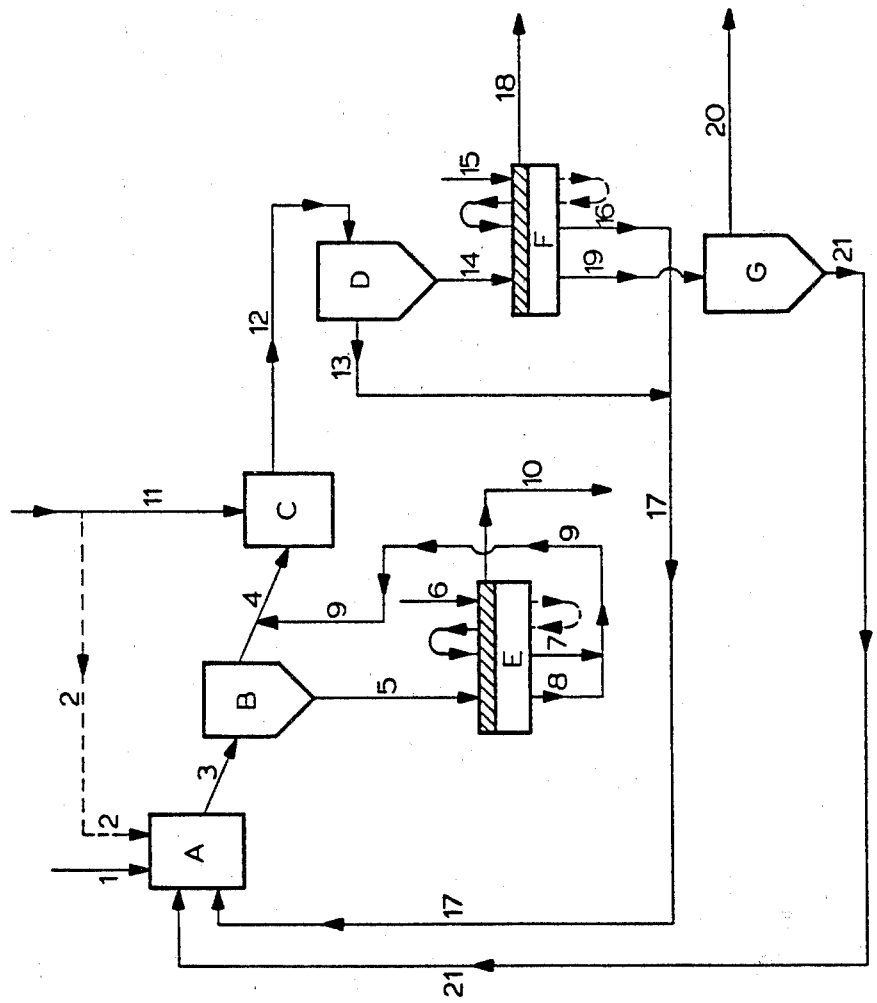
FIG. 1 is a diagrammatic representation of a phosphate rock digestion process in which, in addition to phosphoric acid, on the one hand a calcium sulphate with low radium content is obtained and, on the other hand, a concentrate of yttrium and lanthanides is obtained.

Through line 1 phosphate rock, through line 17 a recirculated raw phosphoric acid solution and through line 21 a weak acid slurry containing phosphoric acid are fed to digestion vessel A. Through line 3 an inert containing monocalciumphosphate digestion liquor is fed from A to concentrator B, from which a liquid containing monocalciumphosphate is carried off through line 4, to precipitation vessel C, and a slurry containing inert and monocalciumphosphate is carried off through line 5 to filter E. Water is added to E through line 6, while through line 7 a phosphate containing washing water and through line 8 a solution containing monocalciumphosphate are carried off and fed, through line 9 to line 4. Through line 10 a residue containing radium, yttrium and lanthanides is carried off from E to a processing system not represented (see FIG. 2).

Through line 11 concentrated sulphuric acid is fed, in addition to the monocalciumphosphate solution supplied through line 4, to precipitation vessel C, while through line 12 a calcium sulphate containing phosphoric acid solution is fed to decanter D. From the top of D a clear phosphoric acid solution is drained off through line 13 and returned through line 17 to digestion vessel A. From the bottom of D a thick slurry containing calcium sulphate and phosphoric acid is passed through line 14 to filter F, to which water is added through line 15. From F phosphate containing washing water is carried off through line 16 and returned to digestion vessel A through line 17.

Through line 18 wet calcium sulphate is carried off from F, while a phosphoric acid solution is passed through line 19 to sedimentation vessel G. From the top of G a phosphoric acid solution is carried off as product through line 20, while from the bottom of G a slurry containing phosphoric acid is returned, through line 21, to digestion vessel A.

Through line 2 a small quantity of concentrated sulphuric acid is preferably also fed to digestion vessel A.

FIG. 2

Through line 1 a wet residue containing radium, yttrium and lanthanides, obtained from a phosphate rock digestion liquor (see FIG. 1) containing monocalciumphosphate, is fed, to dissolution vessel A, while nitric acid is added through line 2. From A an insoluble residue is carried off through line 3, while a nitric acid solution containing radium, yttrium and lanthanides is passed through line 4 to neutralization vessel B. Through line 5 ammonia is fed to B in such a quantity that there will just be no precipitation in B. The resulting solution containing ammonium nitrate, radium, yttrium and lanthanides, is passed to extraction vessel C through line 6 together with washing water supplied through line 7 and obtained further on in the process. Through line 8 an organic extractant is also fed to C. From C a radium containing ammonium nitrate solution is carried off through line 9, and through line 10 an extractant phase containing yttrium and lanthanides is passed to washer D, to which water is added through line 11. From D washing water is returned to extraction vessel C via line 7 through line 6, while through line 12 a washed extractant phase is passed to stripper E.

Through line 13a a large quantity of dilute nitric acid is supplied to E, which nitric acid has been obtained by adding to the water supplied through line 13 dilute nitric acid through line 20. From E the organic solvent is carried off, through line 14, to vessel I, while through line 15 a dilute nitric acid solution containing yttrium and lanthanides is passed to precipitation vessel F, to which a large quantity of ammonia is fed through line 16. From F an ammonium nitrate solution is carried off through line 17, while the precipitate formed in F is passed to washer G through line 18. Through line 19 water is added to G, while the used washing water is carried off from G through line 20 and returned, through line 13a, to stripper E. Through line 21 a concentrate of nitrates of yttrium and lanthanides is passed from G to calciner H, from which, through line 22, a concentrate of oxides of yttrium and lanthanides is carried off as product.

To vessel I nitric acid is fed through line 23, in addition to the extractant fed through line 14. Through line 24 a nitric acid solution is passed from I to line 20 and returned to stripper E through line 13a. The extractant is carried off from I through line 25 and returned to extraction vessel C through line 8.

Figure 3:
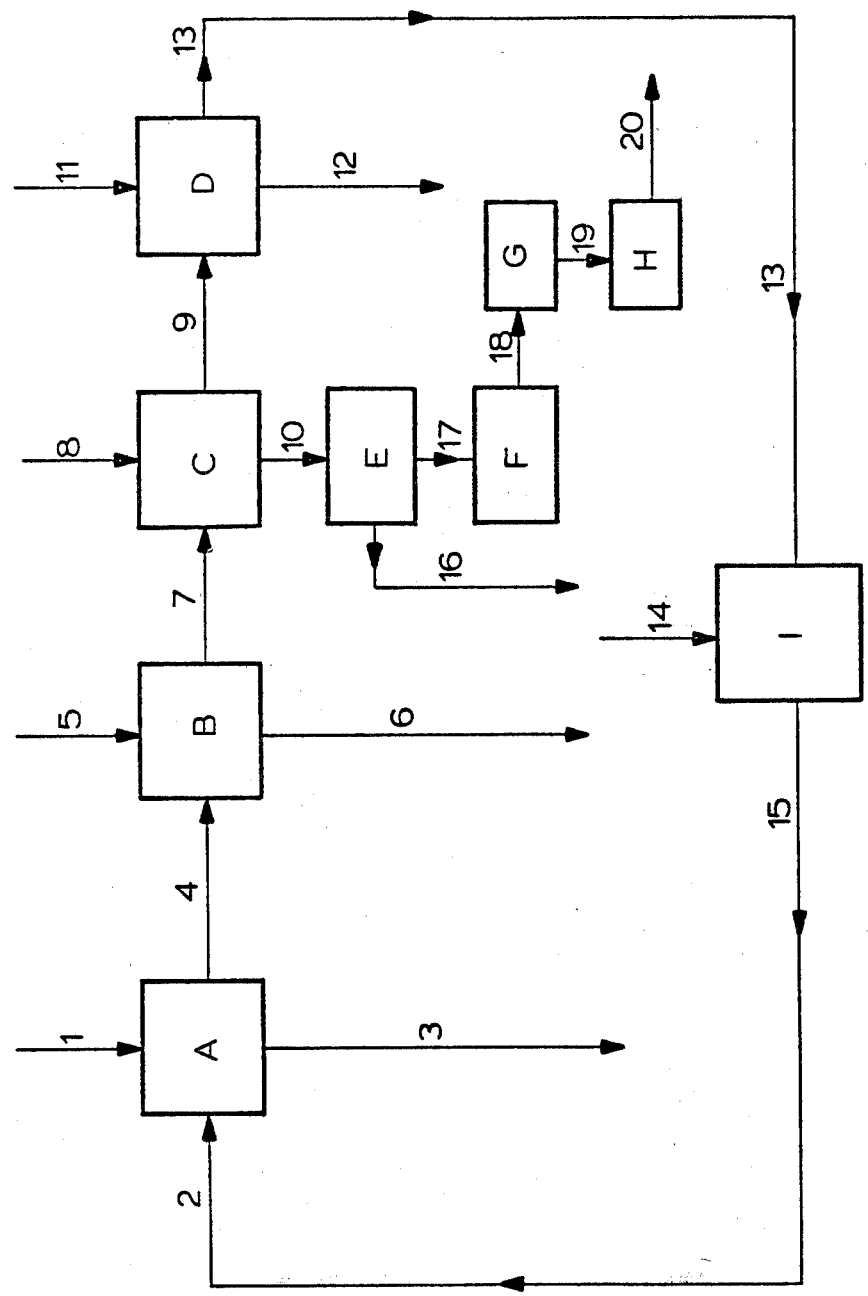
FIG. 3 is a diagrammatic representation of the further processing of a concentrate of yttrium and lanthanides while recovering yttrium and the separate lanthanides (in oxide form).

If it is desired to recover yttrium and the separate lanthanides instead of or in addition to a mixture of (oxides of) yttrium and lanthanides, preference is given to passing the dilute nitric acid solution, containing yttrium and lanthanides and obtained from stripper E, wholly, respectively partly, through line 26 to a processing system not shown in this figure (see FIG. 3).

FIG. 3

Through line 2 a solution of a di-2-ethylhexylphosphoric acid in an organic solvent is fed to extraction vessel A, while a dilute nitric acid solution containing yttrium and lanthanides, which solution has been obtained by stripping an extractant phase loaded with yttrium and lanthanides with dilute nitric acid (see FIG. 2), is supplied through line 1.

Through line 3 a nitric acid solution containing lanthanium, cerium, praseodymium and a small quantity of neodyium in the form of nitrates is carried off. After precipitation by means of an excess of ammonia, followed by washing and calcining, a mixture of the relative oxides can be obtained from it. If so desired, the separate rare earth metals can also be recovered from this nitric acid solution by means of known extractants.

Through line 4 an extractant phase containing the heavy lanthanides (Sm, Eu, Gd, Tb, Dy, Ho, Er, Tm, Yb, Lu), yttrium and most of the neodymium is passed from A to stripper B, to which dilute nitric acid is added through line 5. Through line 6 a nitric acid solution containing neodymium, samarium, gadolinium, terbium and europium in the form of nitrates is carried off. From this solution a mixture of the relative oxides can be obtained through precipitation, washing and calcining. If so desired, the separate rare earth metals mentioned above can also be recovered from this solution by means of known extractants.

Through line 7 an extractant phase containing dysprosium, holmium, erbium, thulium, ytterbium, lutetium and yttrium is carried off from B to stripper C, to which nitric acid is added through line 8. Through line 9 an extractant phase containing ytterbium and lutetium is passed from C to stripper D, while through line 10 a nitric acid solution containing dysprosium, holmium, erbium, thulium and yttrium in the form of nitrates is passed from C to evaporator E. Through extraction with known extractants this solution is separated into a phase containing dysprosium, holmium, erbium and thulium, which is carried off through line 16 and from which, through precipitation, washing and calcining, these rare earth metals are recovered as oxides. If so desired, the separate, above mentioned rare earth metals can be recovered from this phase by means of known extractants. Through line 17 an ytrrium containing phase is passed from E to stripper F, in which the phase is stripped with nitric acid, upon which the nitric acid soution containing yttrium-nitrate is passed, through line 18, to precipitation vessel G. The yttrium containing precipitate obtained herein is passed, optionally after washing, through line 19 to calciner H, from which, through line 20, yttrium oxide is carried off as product.

Through line 11 a sodiumhydroxide solution is added to stripper D, and through line 12 a lye containing ytterbium and lutetium is carried off. If so desired, this lye can be further processed to form a mixture of ytterbiumoxide and lutetiumoxide, or ytterbium and lutetium can be recovered separately from it by means of known extractants.

Through line 13 an extractant solution is passed from D to vessel I, to which sulphuric acid is fed through line 14 and from which, through line 15, an extractant solution is carried off which is returned to extraction vessel A through line 2.

EXAMPLES

Example 1

Through 1 of FIG. 1 1000 kg of Khouribga phosphate having the composition shown in Table 1, through 2 of FIG. 1 70 kg of 96% (wt) sulphuric acid, through 17 of FIG. 1 12666 kg of recirculated phosphoric acid with the composition also shown in Table 1 and through 21 of FIG. 1 35 kg of slurry containing phosphoric acid (solid content of about 31.5% with a radium equivalent of 60 p Ci/g) were fed to digestion vessel A in an arrangement as shown in FIG. 1.

TABLE 1

|  | Phosphate rock | Recirculated H3PO4 |
|---|---|---|
| $P_2O_5$ | 32.5% by wt. | 30% by wt. |
| CaO | 50.6% by wt. | 0.74% by wt. |
| $SO_4$ | 1.9% by wt. | 1.5% by wt. |
| Y | 210 ppm | 3 ppm |
| RE* | 780 ppm | — |
| La | 200 ppm | ≦0.1 ppm |
| Ce | 334 ppm | ≦0.1 ppm |
| Sm | 20 ppm | ≦0.1 ppm |
| Ti | 320 ppm | 1 ppm |
| Zr | 90 ppm | ≦0.1 ppm |
| Ra | 40 p Ci/g | 1 p Ci/g |

*RE is understood to mean, here and elsewhere in the application, the lanthanides jointly.

The temperature in digestion vessel A was kept at about 90° C. Through 3 of FIG. 1 13770 kg of digestion liquor was fed to concentrator B, from which 871 kg of slurry containing inert and phosphate was carried off, through 5 of FIG. 1 to filter E. To this 194 kg of water was added through 6 of FIG. 1 and through 7 of FIG. 1 242 kg of phosphate containing washing water and through 8 of FIG. 1 432 kg of monocalciumphosphate solution were carried off and fed, through 9 of FIG. 1 to line 4 of FIG. 1. From E, 391 kg of wet residue was carried off through 10 of FIG. 1, the composition of which is shown in Table 2, calculated in respect of wet and dry weight.

TABLE 2

|  | Wet residue | Dry Residue |
|---|---|---|
| $P_2O_5$ | 0.6% by wt. | — |
| CaO | 24% by wt. | — |
| $H_2O$ | 31% by wt. | — |
| Ra | 95 p Ci/g | 138 p Ci/g |
| Y | — | 616 ppm |
| Ti | — | 947 ppm |
| Zr | — | 284 ppm |
| RE | — | 2742 ppm |
| La | — | 703 ppm |
| Ce | — | 1190 ppm |
| Sm | — | 67 ppm |

Figure 2:
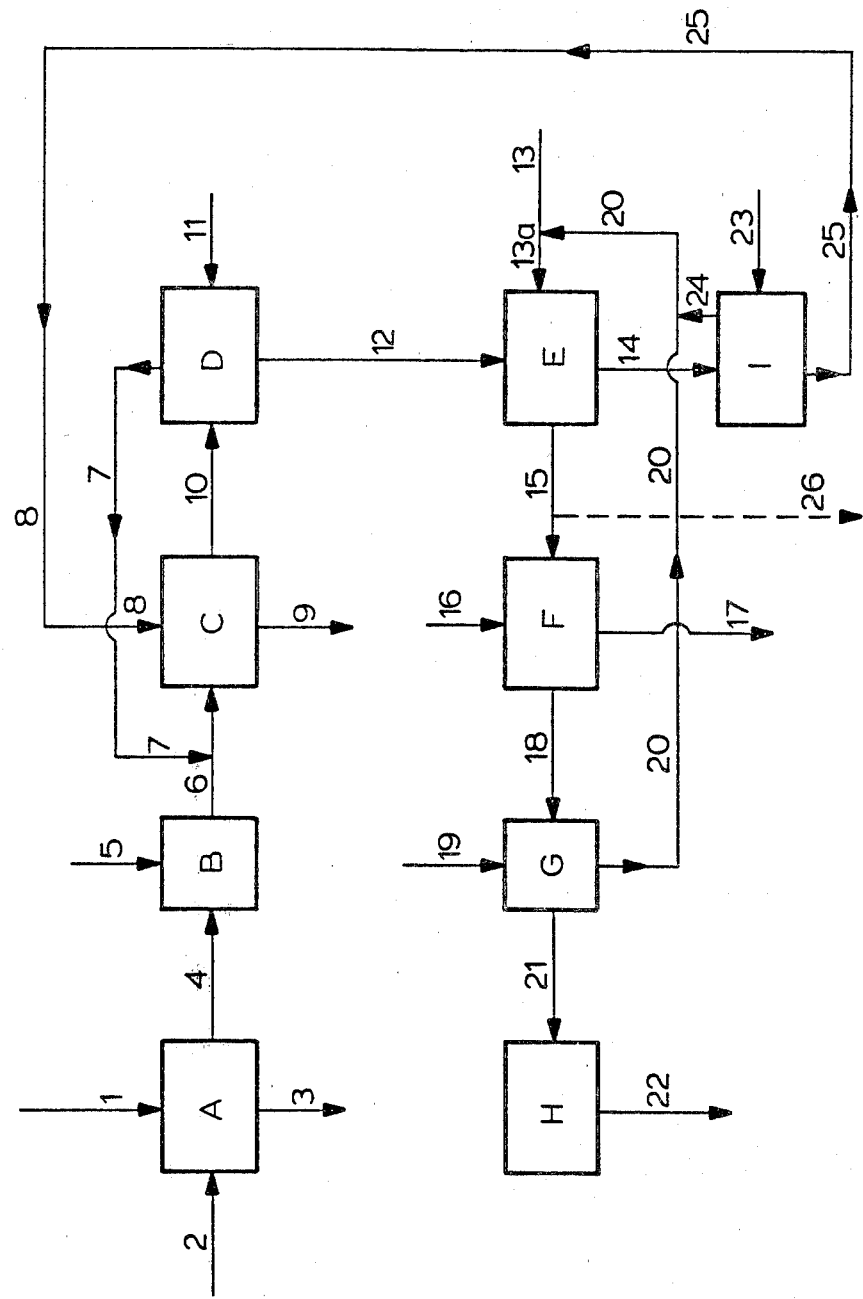
FIG. 2 is a diagrammatic representation of the further processing of the concentrate of yttrium and lanthanides while recovering a mixture of pure oxides.

This residue was processed further in an arrangement as shown in FIG. 2 (see Example 2).

From concentrator B of FIG. 1 12899 kg of monocalciumphosphate solution was carried off through 4 of FIG. 1 and passed, together with 674 kg of dilute phosphate solution supplied through 9 of FIG. 1, to precipitation vessel C. The radium equivalent of the liquid fed to C was 1.2 p Ci/g. To C of FIG. 1 950 kg of 96% (wt) sulphuric acid was fed through 11 of FIG. 1. The temperature in C was kept at about 80° C. From C of FIG. 1 14523 kg of a phosphoric acid solution containing calcium sulphate was passed, through 12 of FIG. 1, to decanter D, from which 11520 kg of phosphoric acid solution was drained off, which was returned to digestion vessel A through 13 and 17 of FIG. 1. Through 14 of FIG. 1 3003 kg of slurry was passed from D to filter F, to which 1020 kg of water was added as well through 15 of FIG. 1.

Through 18 of FIG. 1 1720 kg of wet calcium sulphate, which contained 420 kg of entrained water, was carried off from F. After drying a product was obtained, the composition of which is shown in Table 3.

TABLE 3

|  | Calcium sulphate product |
|---|---|
| $CaSO_4.2 H_2O$ | 96% by wt. |
| $P_2O_5$ | 0.5% by wt. |
| Y | 32 ppm |
| La | 8 ppm |
| Ce | 10 ppm |
| Sm | 2 ppm |
| Ti | 42 ppm |
| Zr | 10 ppm |
| Ra | 2 p Ci/g |

For the purpose of comparison it may be stated that, in a phosphate digestion process without pre-digestion and removal of inert, a calcium sulphate product with a radium equivalent of about 24 p Ci/g is obtained.

Through 16 of FIG. 1 1123 kg of washing water containing phosphoric acid was carried off from F, which water was returned to digestion vessel A through 17 of FIG. 2. Through 19 of FIG. 1 1080 kg of phosphoric acid solution (radium equivalent of 1 p Ci/g) was passed from F to sedimentation vessel G, from which 35 kg of sedimentation slurry (11 kg of solid with a radium equivalent of 60 p Ci/g) was returned, through 21 of FIG. 1, to digestion vessel A.

Through 20 of FIG. 1 1045 kg of phosphoric acid was carried off from G as product, the composition of which is shown in Table 4.

TABLE 4

|  | Product phosphoric acid |
|---|---|
| $P_2O_5$ | 30.2% by wt. |
| $SO_4$ | 1.2% by wt. |
| CaO | 0.44% by wt. |
| Y | 2 ppm |
| La | ≦0.1 ppm |
| Ce | ≦0.1 ppm |
| Sm | ≦0.1 ppm |
| Zr | ≦0.1 ppm |
| Ti | 1 ppm |
| Ra | 0.4 p Ci/g |

EXAMPLE 2

In an arrangement as shown in FIG. 2 391 kg of wet residue having the composition as shown in Table 2 is fed to dissolution vessel A and extracted there twice at a temperature of 80° C. within 900 kg of 2 N nitric acid supplied through 2 of FIG. 2. The inert material left behind is carried off through 3 of FIG. 2. From A of FIG. 2 2100 kg of a nitric acid liquid is fed to neutralization vessel B, to which, through 5, so much ammonia is added that there will be just no precipitation in B. The neutralized solution is passed, through 6 of FIG. 2, to extraction vessel C, to which 650 kg of a 50% by weight solution of tributylphosphate in kerosene is fed through 8 of FIG. 2. From C a radium nitrate and ammonium nitrate containing solution is carried off through 9 of FIG. 2, while the extractant solution is passsed through 10 of FIG. 2 to washer D, to which 70 kg of water is added through 11 of FIG. 2. The contaminated washing water obtained in this process is carried back, through 7 and 6, to extraction vessel C.

Through 12 of FIG. 2 the washed extractant solution is passed to stripper E and stripped there with 700 kg of a dilute nitric acid solution supplied through 13a. Through 14 an extractant solution is passed from E to vessel I and acidified there with nitric acid supplied through 23. Through 24 a nitric acid solution is carried from I and returned to stripper E through 20 and 13a, while through 25 and 8 a purified solution to tributyl-phosphate in kerosene is returned to extraction vessel C.

From E a dilute nitric acid solution containing yttrium and lanthanides is passed to precipitation vessel F, to which so much ammonia is added through 16 that a precipitate containing yttrium and lanthanides is formed. From F an ammonium nitrate solution is carried off through 17, and the precipitate formed is passed through 18 to washer G, to which water is added through 19. The washing water obtained is carried off through 20 and returned to stripper E.

From G the remaining concentrate of nitrates of yttrium and lanthanides is passed, through 21, to calciner H, from which 1048 grams of a concentrate of oxides of yttrium and lanthanides is obtained through 22. This concentrate (purity 98.5%) contains, among other things, 195 grams of $Y_2O_3$, 203 grams of $La_2O_3$, 330 grams of $CeO_2$ and 19 grams of $Sm_2O_3$.

If desired, the dilute nitric acid solution containing yttrium and lanthanides, obtained in 15, can be carried off also through line 26 to a processing system as shown in FIG. 3 for the purpose of recovering from it yttrium and the separate lanthanides (see Example 3).

EXAMPLE 3

In an arrangement as shown in FIG. 3, a dilute nitric acid solution containing yttrium and lanthanides is fed, through 1, to extraction vessel A, to which a 30% by weight solution of di-2-ethylhexylphosphoric acid in kerosene is added through 2. Through 3 a nitric acid solution containing La, Ce, Pr and Nd is carried off. After precipitation with an excess of ammonia, washing of the pecipitate with water and calcining of the washed precipitate 640 g of a mixture of $La_2O_3$, $CeO_2$, $Pr_6O_{11}$ and $Nd_2O_3$ is obtained. From A an extractant solution is passed, through 4, to stripper B and stripped there with 1.5 N nitric acid supplied through 5. Through 6 a nitric acid solution containing Nd, Sm, Cd, Tb and Eu is carried off from B, from which solution, through extraction and/or precipitation, washing and calcining, a mixture of oxides is obtained containing 98 grams of $Nd_2O_3$, 17 grams of $Sm_2O_3$, 18 grams of $(Gd_2O_3+Tb_4O_7)$ and 9 grams of $Eu_2O_3$.

Through 7 the remaining extractant solution is passed from B to stripper C and stripped there with 6 N nitric acid supplied through 8. The nitric acid stripped solution is passed through 10 to evaporator E. From the concentrated yttrium nitrate containing solution formed in this process (130 gy/liter) an yttrium containing phase is carried off by extraction with a quaternary ammonium compound to stripper F and stripped there with dilute nitric acid. Through 18 an yttrium containing nitric acid solution is passed to precipitation vessel G and precipitated there by means of oxalic acid. The precipitate formed is passed, through 19, to calciner H, from which, through 20 of FIG. 3 186 grams of $Y_2O_3$ (99.99% pure) is carried off as product.

From E a phase containing Dy, Ho, Er and Tm is carried off through 16, from which phase through, for instance, precipitation, washing and calcining 12 grams of a mixture of $Dy_2O_3$, $Ho_2O_3$, $Er_2O_3$ and $Tm_2O_3$ is recovered.

From C the remaining extractant solution is passed, through 9, to stripper D and stripped there with sodium hydroxide of 10% strength supplied through 11. Through 12 a caustic solution containing Yb and Lu is carried off, from which 1 g of $(Yb_2O_3+Lu_3O_3)$ can be recovered. Through 13 the extractant solution free of rare earths is carried off from D and passed to vessel I, acidified there with sulphuric acid supplied through 14 and subsequently returned, through 15 and 2, to extraction vessel A.

EXAMPLE 4

Through 1 of FIG. 1 1000 kg of Khouribga phosphate having the composition shown in Table 1, through 17 of FIG. 1 12666 kg of recirculated phosphoric acid having the composition shown in Table 5 and through 21 of FIG. 1 35 kg of slurry containing phosphoric acid (11 kg of solid with a radium equivalent of 60 p Ci/g) were fed to digestion vessel A in an arrangement as shown in FIG. 1.

TABLE 5

| $P_2O_5$ | 30% by wt. |
|---|---|
| CaO | 0.74% by wt. |
| $SO_4$ | 1.5% by wt. |
| Y | 4 ppm |
| La, Ce, Sm | $\leq 0.1$ ppm |
| Ti | 2 ppm |
| Zr | $\leq 0.5$ ppm |
| Ra | 1 p Ci/g |

The temperature in vessel A was kept at about 90° C. Through 3 of FIG. 1 13700 kg of digestion liquor was passed to concentrator B, from which 548 kg of slurry containing inert and phosphate was carried off through 5 to filter E. To E of FIG. 1 122 kg of water was added through 6, and through 7 of FIG. 1 152 kg of phosphate containing washing water and through 8 of FIG. 1 272 kg of monocalciumphosphate solution were carried off and fed, through 9, to line 4. From E of FIG. 1 246 kg of wet residue was carried off through line 10, the composition of which residue is shown in Table 6, calculated in respect of wet and dry weight.

TABLE 6

|  | Wet residue | Dry residue |
|---|---|---|
| $P_2O_5$ | 0.62% by wt. | — |
| CaO | 22% by wt. | — |
| $H_2O$ | 31% by wt. | — |
| Ra | 134 p Ci/g | 194 p Ci/g |
| Y | — | 90 ppm |
| Ti | — | 1374 ppm |
| Zr | — | 397 ppm |
| La | — | 1059 ppm |
| Ce | — | 1764 ppm |
| Sm | — | 94 ppm |

This residue can be further processed in an arrangement as shown in FIG. 2 according to the process described in Example 2.

From concentrator B of FIG. 1 13152 kg of monocalciumphosphate solution was carried off through 4 and passed, together with 424 kg of dilute phosphate solution supplied through 9, to precipitation vessel C. The radium equivalent of the liquid supplied to C was 1.5 p Ci/g. To C of FIG. 1 1020 kg of 96% (wt) sulphuric acid was fed through 11. The temperature in C was kept at about 80° C.

From C of FIG. 1 14579 kg of a calcium sulphate containing phosphoric acid solution was passed, through 12, to decanter D. From this 11455 kg of phosphoric acid solution was carried off through 13 and returned through 17, to digestion vessel A, while 3142 kg of slurry was passed, through 14, to filter F, to which, moreover, 1100 kg of water was added through 15.

Through 18 of FIG. 1 1850 kg of wet calcium sulphate, containing 450 kg of entrained water, was carried off from F. After drying a product was obtained, the composition of which is shown in Table 7.

TABLE 7

| | |
|---|---|
| $CaSO_4.2 H_2O$ | 96% by wt. |
| $P_2O_5$ | 0.5% by wt. |
| Y | 38 ppm |
| La | 14 ppm |
| Ce | 19 ppm |
| Sm | 3 ppm |
| Ti | 61 ppm |
| Zr | 13 ppm |
| Ra | 4.7 p Ci/g |

Through 16 of FIG. 1 1211 kg of washing water containing phosphoric acid was carried off from F, which water was returned to A through 17. Through 19 of FIG. 1 1080 kg of phosphoric acid solution (radium equivalent 1 p Ci/g) was passed from F to sedimentation vessel G, from which 35 kg of sedimentation slurry was returned, through 21, to A.

Through 20 of FIG. 1 1045 kg of phosphoric acid was carried off as product from G, which product was of virtually the same composition as the product shown in Table 4. Only the CaO content was 0.41% by weight and the Zr content ≦0.5 ppm.

EXAMPLE 5

Through 1 of FIG. 1 1000 kg of phosphate rock (composition see Table 8), through 17 of FIG. 1 9000 kg of recirculated phosphoric acid (composition see Table 8) and through 21 of FIG. 1 40 kg of slurry containing phosphoric acid (19 kg of solid with a radium equivalent of 70 p Ci/g) were fed to digestion vessel A in an arrangement as shown in FIG. 1.

TABLE 8

| | Phosphate rock | Recirculated phosphoric acid |
|---|---|---|
| $P_2O_5$ | 33.5% by wt. | 37.5% by wt. |
| CaO | 50.3% by wt. | 0.93% by wt. |
| $SO_4$ | 1.9% by wt. | 1.3% by wt. |
| Y | 230 ppm | 5 ppm |
| La | 110 ppm | ≦0.1 ppm |
| Ra | 40 p Ci/g | 0.9 p Ci/g |

The temperature in A was kept at about 90° C. Through 3 of FIG. 1 10040 kg of digestion liquor was fed from A to concentrator B, from which 584 kg of slurry was carried off, through 5, to filter E. To E of FIG. 1 125 kg of water was added through 6, and through 7 of FIG. 1 181 kg of phosphate containing washing water and through 8 of FIG. 1 284 kg of monocalciumphosphate solution were carried off and passed, through 9 and 4, to precipitation vessel C.

Through 10 of FIG. 1 254 kg of wet residue was carried off from E, the composition of which residue is shown in Table 9, calculated in respect of wet and dry weight.

TABLE 9

| | Wet residue | Dry residue |
|---|---|---|
| $P_2O_5$ | 0.7% by wt. | — |
| CaO | 17.3% by wt. | — |
| $H_2O$ | 35% by wt. | — |
| Ra | 141 p Ci/g | 218 p Ci/g |
| Y | — | 1146 ppm |
| La | — | 574 ppm |

This residue can be further processed according to the process shown in Example 2.

From concentrator B of FIG. 1 9456 kg of monocalciumphosphate solution was carried off through 4 and passed, together with 455 kg of phosphate solution supplied through 9, to precipitation vessel C, to which, moreover, 980 kg of 98% (wt) sulphuric acid was fed through 11. The temperature in C was kept at about 85° C.

From C in FIG. 1 10891 kg of a calcium sulphate containing phosphoric acid solution was passed, through 12, to decanter D, from which 8150 kg of phosphoric acid solution was returned, through 13 and 17, to A. From the bottom of D of FIG. 1 2740 kg of slurry was passed, through 14, to filter F, to which, moreover, 700 kg of water was added through 15.

Through 18 of FIG. 1 1280 kg of wet calcium sulphate product (430 kg of entrained water) was carried off from F. After drying a calcium-sulphatehemihydrate product was obtained having the composition shown in Table 10.

TABLE 10

| | |
|---|---|
| $P_2O_5$ | 0.6% by wt. |
| Y | 30 ppm |
| La | 12 ppm |
| Ra | 3 p Ci/g |

Through 16 of FIG. 1 850 kg of washing water containing phosphoric acid (26.8% by wt of $P_2O_5$) was carried off from F, which water was returned to A through 17. Through 19 of FIG. 1 870 kg of phosphoric acid solution (38.6% by wt of $P_2O_5$) was passed from F to sedimentation vessel G, from which 40 kg of sedimentation slurry was returned to A through 21.

Through 20 of FIG. 1 830 kg of phosphoric acid was carried off as product from G, the composition of which product is shown in Table 11.

TABLE 11

| | |
|---|---|
| $P_2O_5$ | 40% by wt. |
| $SO_4$ | 0.9% by wt. |
| CaO | 0.3% by wt. |
| Y | 3 ppm |
| La | ≦0.1 ppm |
| Ra | 0.3 p Ci/g |

EXAMPLE 6

1000 g of wet process phosphoric acid with a $P_2O_5$ content of 30% by weight and a sulphate content of 1.7% by weight were introduced in a stirred vessel provided with a reflux cooler. Thereafter, a mixture of 100 g of Khouribga phosphate ($P_2O_5$-content 32.4% by weight) and 1 g powdered iron were added. The temperature in the vessel was maintained at about 90° C.

After about 15 minutes of stirring the precipitate formed (about 20 g) was filtered off, washed with water and analyzed. The results are summarized in Table 12 below.

EXAMPLE 7 (COMPARATIVE EXAMPLE)

Example 6 was repeated but with no iron added to the Khouribga phosphate. The analysis results are also summarized in Table 12

TABLE 12

| | Phosphate rock | Precipitate without Fe-addition | Precipitate with Fe-addition |
|---|---|---|---|
| U | 132 ppm | ≦10 ppm | 830 ppm |
| Ce | 170 ppm | 260 ppm | 710 ppm |
| Sm | 60 ppm | 175 ppm | 295 ppm |
| Lu | 6.5 ppm | ≦3 ppm | 21 ppm |
| Eu | 10 ppm | ≦3 ppm | 59 ppm |

What is claimed is:

1. Process for the recovery of substantially radium free calcium sulphate, yttrium and lanthanides in a phosphoric acid preparation process comprising the steps of,
   (a) digesting phosphate rock with an excess of phosphoric acid required for the formation of monocalciumphosphate in the presence of more than about 5% by weight of sulphate ions calculated in respect of the quantity of phosphate rock to form a digestion liquor comprising an insoluble residue and a monocalcium phosphate solution,
   (b) separating out said insoluble residue from said digestion liquor,
   (c) precipitating calcium sulphate from the monocalcium phosphate solution with sulphuric acid forming a calcium sulphate precipitate and a phosphoric acid solution,
   (d) separating said precipitated calcium sulphate from said phosphoric acid solution, and
   (e) separating yttrium and lanthanides from said insoluble residue of step (b).

2. Process in accordance with claim 1 wherein at least a portion of said phosphoric acid solution of step (d) is used in the digestion of said phosphate rock of step (a).

3. Process in accordance with claim 2 wherein at least a portion of said phosphoric acid solution of step (d) is settled forming a weak acid slurry and said slurry is used to digest the phosphate rock.

4. Process in accordance with claim 1 wherein sulphuric acid is present in step (a) to digest said phosphate rock.

5. Process in accordance with claim 1 wherein a reducing agent is added to at least one of,
   (i) said phosphate rock, and
   (ii) said digestion liquor.

6. Process in accordance with claim 5 wherein the said reducing agent is at least one of, powdered metallic iron, zinc or aluminum.

7. Process in accordance with claim 6 wherein the amount of said reducing agent is from about 0.25 to about 1.5% by weight calculated in respect of the amount of said phosphate rock.

8. Process in accordance with claim 1 wherein a flocculant is added intermediate to steps (a) and (b).

9. Process in accordance with claim 1 comprising the steps of (i) treating said residue of step (b) with acid to form an acid liquid and (ii) separating yttrium and lanthanides from said acid liquid.

10. Process in accordance with claim 9, wherein said acid liquid of step (i) is neutralized and said neutralized liquid is extracted with organic solvent to recover said yttrium and lanthanides.

* * * * *